US011908003B2

(12) United States Patent
Price et al.

(10) Patent No.: US 11,908,003 B2
(45) Date of Patent: Feb. 20, 2024

(54) METHODS AND SYSTEMS FOR UPDATING A USER INTERFACE BASED ON LEVEL OF USER INTEREST

(71) Applicant: Capital One Services, LLC, McLean, VA (US)

(72) Inventors: Micah Price, Plano, TX (US); Chi-san Ho, Allen, TX (US); Yue Duan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 115 days.

(21) Appl. No.: 17/000,480

(22) Filed: Aug. 24, 2020

(65) Prior Publication Data

US 2022/0058731 A1 Feb. 24, 2022

(51) Int. Cl.
*G06Q 40/02* (2023.01)
*G06Q 30/02* (2023.01)
*G06Q 30/06* (2023.01)
*G06Q 40/03* (2023.01)
*G06F 16/28* (2019.01)
*G06F 9/451* (2018.01)
*G06F 16/9535* (2019.01)
(Continued)

(52) U.S. Cl.
CPC ............ *G06Q 40/03* (2023.01); *G06F 9/451* (2018.02); *G06F 16/285* (2019.01); *G06F 16/9535* (2019.01); *G06N 20/00* (2019.01); *G06Q 30/0185* (2013.01); *G06Q 30/0205* (2013.01); *G06Q 50/265* (2013.01); *G06Q 30/0269* (2013.01)

(58) Field of Classification Search
CPC .......... G06Q 40/02; G06Q 30/02; G06Q 30/06
USPC .......................................................... 705/7.34
See application file for complete search history.

(56) References Cited

U.S. PATENT DOCUMENTS 7,925,743 B2   4/2011   Neely et al.
10,055,756 B2  8/2018   Greenzeiger et al.
(Continued)

*Primary Examiner* — Nga B Nguyen
(74) *Attorney, Agent, or Firm* — Bookoff McAndrews, PLLC

(57) ABSTRACT

A computer-implemented method for providing a personalized interface to a user based on whether the user is serious about making a purchase may include: obtaining customer identification data and customer input data a customer, wherein the customer input data comprises a request from the customer; determining a request status of the customer based on the customer identification data and the customer input data; obtaining customer interface activity data of the customer based on the request status; obtaining customer purchasing data of the customer based on the request status; generating a prediction model based on the customer interface activity data and the customer purchasing data; training the generated prediction model by classifying the customer based on the customer interface activity data and the customer purchasing data; obtaining user identification data and user interface activity data of a user via a user device, the user interface activity data indicating interactive activities between the user and a user interface displayed on the user device; determining a rating of the user to purchase a product based on the user identification data, the user interface activity data, and the prediction model; and providing, to the user, an updated user interface on the user device based on the determined rating.

20 Claims, 4 Drawing Sheets

(51) Int. Cl.
  *G06Q 30/018* (2023.01)
  *G06Q 30/0204* (2023.01)
  *G06N 20/00* (2019.01)
  *G06Q 50/26* (2012.01)
  *G06Q 30/0251* (2023.01)

(56) References Cited

U.S. PATENT DOCUMENTS

| | | | |
|---|---|---|---|
| 10,984,305 B1* | 4/2021 | Walters | H04L 67/535 |
| 11,138,631 B1* | 10/2021 | Perevodchikov | G06N 20/20 |
| 11,188,940 B1* | 11/2021 | Vanderveld | G06Q 30/0255 |
| 2009/0037355 A1* | 2/2009 | Brave | G06F 16/9535 |
| | | | 706/45 |
| 2010/0131835 A1* | 5/2010 | Kumar | G06Q 30/0269 |
| | | | 715/205 |
| 2010/0281389 A1* | 11/2010 | Hutchinson | H04L 67/142 |
| | | | 715/736 |
| 2011/0016121 A1 | 1/2011 | Sambrani et al. | |
| 2013/0282430 A1 | 10/2013 | Kannan et al. | |
| 2015/0154617 A1* | 6/2015 | DiPietro | G06Q 30/0201 |
| | | | 705/7.29 |
| 2016/0323399 A1* | 11/2016 | Katsev | G06F 11/30 |
| 2017/0053208 A1* | 2/2017 | Krishnamurthy | G06N 5/022 |
| 2018/0158073 A1 | 6/2018 | Chakraborty et al. | |
| 2019/0124167 A1* | 4/2019 | Reshef | H04L 67/02 |
| 2019/0385219 A1* | 12/2019 | Ouyang | G06Q 30/0641 |
| 2020/0074519 A1* | 3/2020 | Devageorge | H04W 4/21 |
| 2021/0342429 A1* | 11/2021 | Balakrishnan | G06F 21/316 |
| 2022/0029904 A1* | 1/2022 | Zenine | H04L 43/0876 |
| 2022/0035888 A1* | 2/2022 | Diaz | G06Q 30/0201 |

\* cited by examiner

METHODS AND SYSTEMS FOR UPDATING A USER INTERFACE BASED ON LEVEL OF USER INTEREST

TECHNICAL FIELD

Various embodiments of the present disclosure relate generally to displaying an updated user interface to a user, and, more particularly, to displaying the updated user interface to the user based on a rating of the user to purchase a product.

BACKGROUND

Visitors to a retail establishment, be it physical or electronic, may fall into two general categories: serious customers (e.g., a customer interested and/or committed to making a purchase) or non-serious customers (e.g., a customer that is browsing and/or not committed to making a purchase). Information or actions that may lead or entice a non-serious customer toward being a serious customer may be different than information or actions that may be desired by a serious customer when making a purchase. Further, it may be difficult to discern one type of customer from the other, especially when products may be offered for sale electronically with little or no direct interaction with the customer, and especially when a merchant has limited or no information about the customer. Thus, it may be difficult to develop information and/or actions for a merchant that are adapted to a customer's level of interest.

The present disclosure is directed to overcoming the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing an updated user interface to a user. The disclosed methods and systems may improve a user's experience when searching for products to buy, and may improve efficiency during the process of purchasing products.

In an aspect, a computer-implemented method may include: obtaining, via one or more processors, customer identification data and customer input data of at least one customer, wherein the customer input data includes a request submitted by the at least one customer; determining, via the one or more processors, a request status of the at least one customer based on the customer identification data and the customer input data; obtaining, via the one or more processors, customer interface activity data of the at least one customer based on the request status of the at least one customer; obtaining, via the one or more processors, customer purchasing data of the at least one customer based on the request status of the at least one customer; generating, via the one or more processors, a prediction model based on the customer interface activity data and the customer purchasing data of the at least one customer; training, via the one or more processors, the generated prediction model, the training including classifying the at least one customer based on the customer interface activity data and the customer purchasing data; obtaining, via the one or more processors, user identification data and user interface activity data of a user via a user device associated with the user, wherein the user interface activity data indicates one or more interactive activities between the user and a user interface displayed on the user device; determining, via the one or more processors, a rating of the user to purchase a product based on the user identification data, the user interface activity data, and the prediction model; and providing, to the user, an updated user interface on the user device associated the user based on the determined rating of the user to purchase the product.

In another aspect, a computer-implemented method may include: obtaining, via one or more processors, customer identification data and customer input data of at least one customer, wherein the customer input data includes a prequalification request submitted by the at least one customer; determining, via the one or more processors, a prequalification status of the at least one customer based on the customer identification data and the customer input data, wherein the prequalification status of the at least one customer identifies the at least one customer as a prequalified customer; obtaining, via the one or more processors, customer interface activity data of the at least one customer based on the prequalification status of the at least one customer; obtaining, via the one or more processors, customer purchasing data of the at least one customer based on the prequalification status of the at least one customer; generating, via the one or more processors, a prediction model based on the customer interface activity data and the customer purchasing data of the at least one customer; training, via the one or more processors, the generated prediction model, the training including classifying the at least one customer based on the customer interface activity data and the customer purchasing data; obtaining, via the one or more processors, user identification data and user interface activity data of a user via a user device associated with the user, wherein the user interface activity data indicates one or more interactive activities between the user and a user interface including one or more original layouts displayed on the user device; determining, via the one or more processors, a rating of the user to purchase a product based on the user identification data, the user interface activity data, and the prediction model; and providing, to the user, an updated user interface on the device associated the user based on the rating of the user to purchase the product, wherein the updated user interface includes one or more adjusted layouts that are different from the one or more original layouts.

In yet another aspect, a computer system for providing a vehicle recommendation to a user may include a memory storing instructions, and one or more processors configured to execute the instructions to perform operations. The operations may include: obtaining customer identification data and customer input data of at least one customer, wherein the customer input data includes a request submitted by the at least one customer; determining a request status of the at least one customer based on the customer identification data and the customer input data; obtaining customer interface activity data of the at least one customer based on the request status of the at least one customer; obtaining customer purchasing data of the at least one customer based on the request status of the at least one customer; generating a prediction model based on the customer interface activity data and the customer purchasing data of the at least one customer; training the generated prediction model, the training including classifying the at least one customer based on the customer interface activity data and the customer purchasing data; obtaining user identification data and user interface activity data of the user via a user device associated with a user, wherein the user interface activity data indicates one or more interactive activities between the user and a user interface displayed on the user device; determining a rating of the user to purchase a product based on the user identification data, the user interface activity data, and the prediction model; and providing, to the user, an updated user interface on the user device associated the user based on the determined rating of the user to purchase the product.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
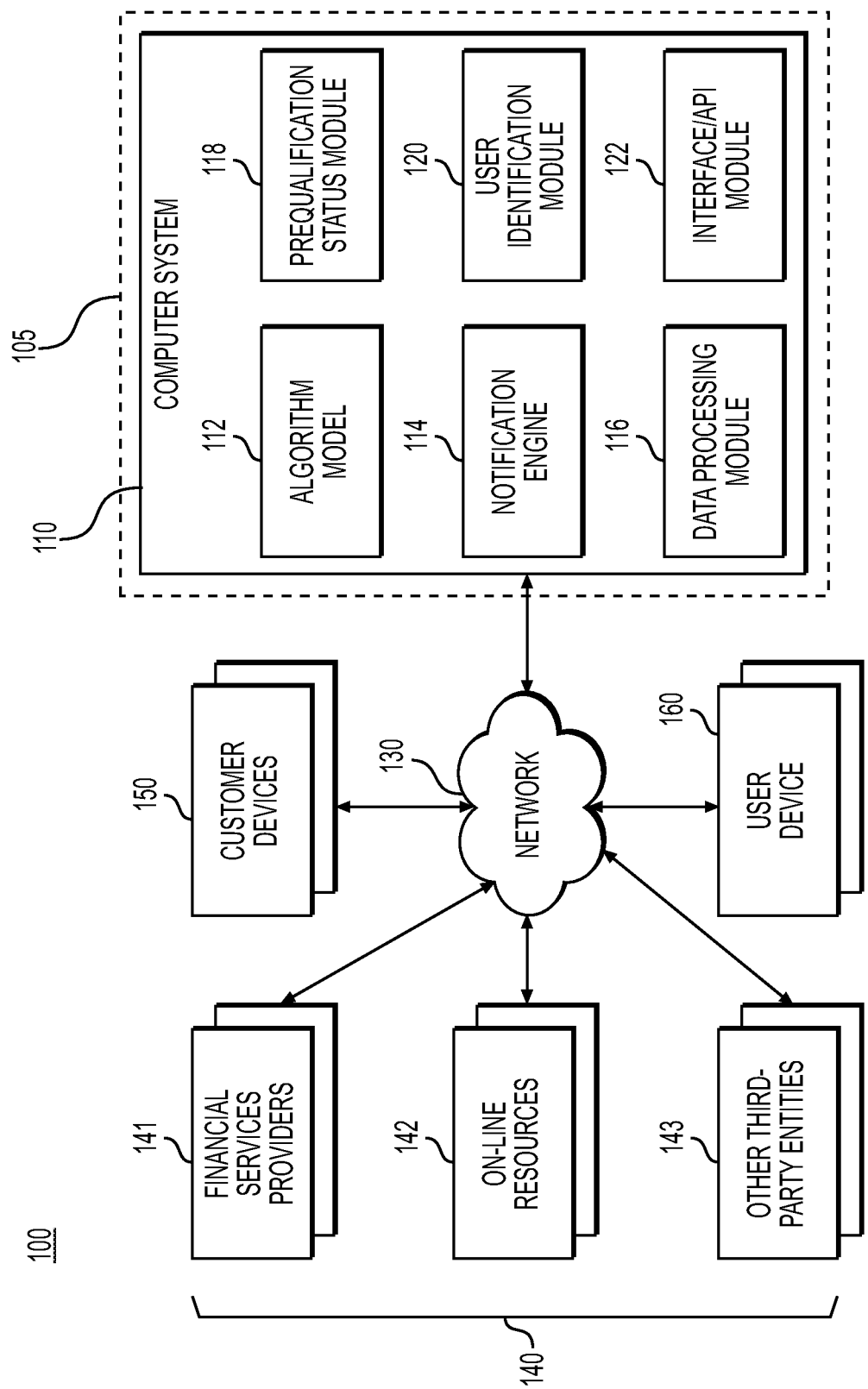
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value. The terms "customer", "buyer", "purchaser", "user", "visitor", and the like generally encompass individuals or entities that are viewing products for sale, contemplating a purchase of a product, are purchasing a product, or have purchased a product. The term "product" generally encompasses goods, services, or combinations thereof.

An electronic merchant may offer products for sale electronically, e.g., via a website page or an electronic application, or the like. In addition to offers, an electronic store may include content designed to, for example, inform a visitor about the offered products, entice the visitor to make a purchase or perform another desired action such as sign up for a membership or subscription, fill out a questionnaire, seek financial prequalification associated with a purchase, or the like. However, different types of customers may be more receptive to and/or targeted by different types of content, and thus it may be difficult to design an electronic store that is adapted to any particular customer.

For example, a serious purchaser seeking to buy a particular car may be relatively more interested in and/or receptive to information on obtaining financing, and relatively less interested and/or receptive to advertising material for various vehicles. In another example, a non-serious purchaser browsing a merchant's inventory may be relatively less interested in and/or receptive to information on obtaining financing, and relatively more interested and/or receptive to advertising material for various vehicles. Displaying content that a particular visitor may be less interested in and/or less receptive to may negatively impact the visitor's experience and/or result in visitor disengagement.

Moreover, an electronic store may permit visitors to browse, view, and/or purchase products with at least some anonymity, and thus it may be difficult to even discern what type of customer a particular visitor may be. Therefore, there is a need for techniques for determining what type of customer a visitor to an electronic store may be, and for tailoring the visitors experience with the electronic store to their determined customer type.

In an exemplary use case, an electronic merchant may employ a system configured to determine a customer type for a visitor, and to tailor a visitor experience of an electronic store to the visitor based on the determined customer type. In some embodiments, in response to the visitor first accessing the electronic store, the system may configure the electronic store to provide a neutral customer experience, e.g., not geared toward either a serious customer or a non-serious customer. In other embodiments, the electronic store may have an initial configuration for a serious customer experience, a non-serious customer experience, or any suitable type of customer experience. As the visitor interacts with the electronic store, e.g., via selecting options, navigating to various areas of the electronic store, searching for or viewing products, or the like, the system may track the visitor's interactions with the electronic store.

Based on the tracked interactions, the system may determine whether the visitor is more likely a serious customer or a non-serious customer, and may determine a customer type for the visitor based on the determined likelihood. The system may configure the electronic store based on the determined customer type. For example, the system may prominently arrange or add advertising content in response to determining that the visitor is a non-serious customer, and may prominently arrange or add information or services related to financing for a purchase in response to determining that the visitor is a serious customer. It should be understood that these examples of configuration changes are illustrative only, and that various types of content may be added, removed, rearranged, highlighted, or the like when configuring an electronic store based on a determined customer type.

Any suitable technique and/or criteria for determining a customer type of a visitor based on the tracked interactions of the visitor on the electronic store may be used. Some interactions, such as adding a product to a shopping cart, initiating a purchase, or the like may be highly indicative that a visitor is a serious customer. However, such interactions may not occur until late in the process of a visitor visiting the electronic store. Other interactions may also be indicative that a visitor is a serious customer, such as performing searches for a particular product, navigating to particular areas of the electronic store, selecting options for a particular product, or the like. Similarly, some interactions may be indicative that a visitor is a non-serious customer, such as browsing a wide variety of products, navigating to particular areas of the electronic store, or the like.

In some embodiments, a customer type for a visitor may be determined based on one or more interactions of the visitor matching one or more interactions associated with a particular customer type. However, there may be overlap between interactions associated with serious and non-serious customers. Further, serious customers may interact with the electronic store in ways associated with non-serious customers and vice-versa. Miss-determination of the customer type for a visitor may result in miss-tailoring of the visitor's experience with the electronic store.

Historical interactions of prior visitors who did make purchases, and thus may be considered serious customers, and/or of prior visitors who did not make purchases, and thus may be considered non-serious customers, may be used to form a model of interactions for a serious and/or non-serious customer that may be compared against the visitor's tracked interactions. However, some serious customers may not have ended up making a purchase, and some non-serious customers may have ended up making a purchase, and thus a model based on historical purchase decisions alone may result in false positive and/or false negative determinations of a serious customer.

Other criteria may be used to identify serious customers in order to generate a model of interactions for a serious customer. For example, obtaining financial or loan prequalification by the customer is generally a perquisite to completing a transaction for the purchase of a vehicle, real estate, etc. A customer that has a prequalification may be considered a serious customer whether or not that customer ultimately made a purchase or not. Thus, in some embodiments, the system may identify historical customers that have obtained such a prequalification, and generate a model of interactions for a serious customer based on tracked interactions of the identified customers.

However, the interaction behavior of a customer may change once the customer has obtained a prequalification. Thus, the full tracked interactions of the identified customers may not be indicative of the interactions of a serious customer prior to obtaining a prequalification. Thus, in some embodiments, the system may extract a portion of the tracked history of each identified customer, and use the extracted portions to generate the model. The extracted portion may include, for example, a portion of the tracked interactions prior to the customer obtaining the prequalification, a portion corresponding to a predetermined period of time such as a period of time corresponding to the customer's first visit to the electronic store, or the like.

Any suitable technique for generating a model of customer interactions may be used. In some embodiments, tracked interactions of customers of a particular customer type are tallied together to identify one or more interactions that a commonly associated with customers of that type. However, a tally of interactions may not consider an order, pattern, frequency, speed, relationships or correlations between interactions, or other factors that may be indicative of a customer type. In some embodiments, the system may employ one or more machine learning techniques to generate one or more models of interactions indicative of a particular type of customer.

Any suitable machine learning techniques may be used. In one example, the system may employ one or more machine learning algorithms. Generally, employing a machine learning algorithm encompasses training a machine learning model so as to be configured to make a classification, and then providing a sample to the trained machine learning model in order to determine a classification for the sample. Training data generally includes one or more historical samples and ground truth classifications for the historical samples. By training the machine learning model, the machine learning model may learn correlations and/or relationships between various aspects of the historical samples and the associated ground truths. In an exemplary use case, training data for a machine learning model may include (i) the portions of tracked interactions for customers identified to have a prequalification and from a period of time prior to the customers obtaining the prequalification, and (ii) a ground truth classification for the identified customers having a prequalification as serious customers. Any suitable training data may be used. Any suitable machine learning model may be used. In some embodiments, the machine learning model includes a neural network that includes one or more layers of neurons. The trained machine learning model may thus determine a classification, e.g., a customer type, for a given set of tracked interactions of a visitor to the electronic store. The system may then configure the electronic store based on the determined customer type in order to tailor the visitor's experience on the electronic store to the visitor.

In another exemplary use case of training a machine learning model, a merchant may provide an electronic store offering a variety of vehicles for sale. Visitors to the electronic store may search the inventory of the electronic store, and may specify one or more aspects of a desired vehicle such as make, model, year, price, engine type, seats, etc. Generally, obtaining a loan or financing preauthorization may be a prerequisite to completing a transaction to purchase a vehicle. Over time, a system for classifying visitors and tailoring the configuration of the electronic store may track user interactions with the electronic store as well as whether the visitors obtained such preauthorization. Visitors identified as having obtained the preauthorization may be classified as serious customers, and portions of the tracked interactions of the serious customers prior to obtaining the preauthorization may be used to generate a model of interactions associated with a serious customer.

In a further exemplary use case of tailoring a visitor's experience on an electronic store, a visitor that is a serious customer may access the electronic store of the merchant. The visitor may interact with the electronic store in one or more ways such as, for example, searching for a particular vehicle and/or specifying one or more aspects of the vehicle, viewing detailed information about a particular vehicle, navigating to a particular portion of the electronic store, hovering a mouse curser or the like over a particular item and/or portion of the electronic store, revisiting the electronic store or a portion thereof multiple times, or the like. The system may track the visitor's interaction and over time, or after a predetermined extent of time for the visit, or after a predetermined number of interactions, or in real-time, or in response to any suitable criteria, the system may use the tracked interactions with a model of interactions associated with a serious customer to determine whether the customer is a serious customer. In response to determining that the visitor is a serious customer, the system may one or more of add, remove, or rearrange content on the electronic store. For example, the system may remove advertising content, may add content associated with obtaining a prequalification, or may rearrange content associated with time-windowed purchase incentives.

In a further exemplary use case of tailoring a visitor's experience on an electronic store, a visitor that is a non-serious customer may access the electronic store of the merchant. The visitor may interact with the electronic store in one or more ways such as, for example, viewing a plurality of different vehicles, quickly moving from page to page, navigating to a particular portion of the electronic store, hovering a mouse curser or the like over a particular item and/or portion of the electronic store, or the like. The system may track the visitor's interaction and over time, or after a predetermined extent of time for the visit, or after a predetermined number of interactions, or in real-time, or in response to any suitable criteria, the system may use the tracked interactions with model of interactions associated with a serious customer to determine whether the customer is a serious customer. In response to determining that the visitor is a non-serious customer, the system may one or more of add, remove, or rearrange content on the electronic store. For example, the system may add advertising content, may remove content associated with obtaining a prequalification, or may rearrange content associated with time-windowed purchase incentives.

FIG. 1 is a diagram depicting an example of a system environment 100 according to one or more embodiments of the present disclosure. The system environment 100 may include a computer system 110, a network 130, one or more resources 140 for collecting data (e.g., user identification data), one or more customer devices 150 associated with a historical customer, and a user device 160 associated with a user, i.e. a current customer. A historical customer is a person that has had a previous interaction with an electronic store associated with the system environment 100. The previous interaction may or may not include a purchase. In some embodiments, a customer device 150 may be used to access the electronic store, and thus may be considered a user device 150. The one or more resources 140 for collecting data may include financial services providers 141, on-line resources 142, or other third-party entities 143. These components may be in communication with one another via network 130.

The computer system 110 may have one or more processors configured to perform methods described in this disclosure. The computer system 110 may include one or more modules, models, or engines. The one or more modules, models, or engines may include an algorithm model 112, a notification engine 114, a data processing module 116, a prequalification status module 118, a user identification module 120, and/or an interface/API module 122, which may each be software components stored in the computer system 110. The computer system 110 may be configured to utilize one or more modules, models, or engines when performing various methods described in this disclosure. In some examples, the computer system 110 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The algorithm model 112 may be a plurality of algorithm models. The algorithm model 112 may include a trained machine learning model (e.g., a k-nearest neighbors algorithm). Details of algorithm model 112 and the trained machine learning model are described elsewhere herein. The notification engine 114 may be configured to generate and communicate (e.g., transmit) one or more notifications (e.g., an updated user interface) to a customer device 150 and/or a user device 160 or to one or more resources 140 through the network 130. The data processing module 116 may be configured to monitor, track, clean, process, or standardize data (e.g., customer interface activity data, prequalification status, customer purchasing data, user identification data, or user interface activity data) received by the computer system 110. One or more algorithms may be used to clean, process, or standardize the data. The prequalification status module 118 may be configured to monitor, track, determine, or store a prequalification status of at least one customer. Such prequalification status may be determined by one or more algorithms provided by one or more resources 140. The user identification module 120 may manage user identification for each user accessing the computer system 110. In one implementation, the user identification associated with each user may be stored to, and retrieved from, one or more components of data storage associated with the computer system 110 or one or more resources 140. The interface/API module 122 may allow the user to interact with one or more modules, models, or engines of the computer system 110. The interface/API may also help track the customer interface activity data, prequalification status, customer purchasing data, user identification data, or user interface activity data.

Computer system 110 may be configured to receive data from other components (e.g., one or more resources 140, customer device 150 or user device 160) of the system environment 100 via network 130. Computer system 110 may further be configured to utilize the received data by inputting the received data into the algorithm model 112 to produce a result (e.g., a rating and/or classification of the customer's interest and or commitment to purchase a product). Information indicating the result may be transmitted to customer device 150, user device 160 and/or one or more resources 140 over network 130. In some examples, the computer system 110 may be referred to as a server system that provides a service including providing the information indicating the received data and/or the result to one or more resources 140, customer device 150, or user device 160.

Network 130 may be any suitable network or combination of networks and may support any appropriate protocol suitable for communication of data to and from the computer system 110 and between various other components in the system environment 100. Network 130 may include a public network (e.g., the Internet), a private network (e.g., a network within an organization), or a combination of public and/or private networks. Network 130 may be configured to provide communication between various components depicted in FIG. 1. Network 130 may comprise one or more networks that connect devices and/or components in the network layout to allow communication between the devices and/or components. For example, the network 130 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 130 may be implemented using cell and/or pager networks, satellite, licensed radio, or a combination of licensed and unlicensed radio.

Financial services providers 141 may be an entity such as a bank, credit card issuer, merchant services providers, or other type of financial service entity. In some examples, financial services providers 141 may include one or more merchant services providers that provide merchants with the ability to accept electronic payments, such as payments using credit cards and debit cards. Therefore, financial services providers 141 may collect and store data pertaining to transactions occurring at the merchants. In some embodiments, financial services providers 141 may provide a platform (e.g., an app on a customer device 150 or user device 160) that a user or a customer can interact with. Such interactions may provide data (e.g., customer interface activity data or user interface activity data) that may be analyzed or used in the method disclosed herein. The financial services providers 141 may include one or more databases to store any information related to the user or the customer. The financial services providers 141 may provide services associated with product transactions. The financial services providers 141 may also collect or store prequalification stats of the customer or the user.

Online resources 142 may include webpage, e-mail, apps, or social networking sites. Online resources 142 may be provided by manufacturers, vehicle dealers, retailers, consumer promotion agencies, and other entities. For example, online resources 142 may include a webpage that users can access to select, buy, or sell a product. Online resources 142 may include other computer systems, such as web servers, that are accessible by computer system 110.

Other third-party entities 143 may be any entity that is not a financial services provider 141 or online resources 142. Other third-party entities 143 may include merchants that may each be an entity that provides products. The term "product," in the context of products offered by a merchant, encompasses both goods and services, as well as products that are a combination of goods and services. A merchant may be, for example, a retailer, a vehicle dealer, a grocery store, an entertainment venue, a service provider, a restaurant, a bar, a non-profit organization, or other type of entity that provides products that a consumer may consume. A merchant may have one or more venues that a consumer may physically visit in order to obtain the products (goods or services) offered by the merchant. In some embodiments, other third-party entities 143 may provide a platform (e.g., an app on a customer device 150 or user device 160) with which a user or a customer can interact. Such interactions may provide data (e.g., user interface activity data) that may be analyzed or used in the method disclosed herein.

The financial services providers 141, the online resources 142, or any other type of third-party entity 143 may each include one or more computer systems configured to gather, process, transmit, and/or receive data. In general, whenever any of financial services providers 141, the online resources 142, or any other type of third-party entity 143 is described as performing an operation of gathering, processing, transmitting, or receiving data, it is understood that such operations may be performed by a computer system thereof. In general, a computer system may include one or more computing devices, as described in connection with FIG. 4 below.

User device 160 and/or customer device 150 may operate a client program, also referred to as a user/customer application, respectively, used to communicate with the computer system 110. The client program may be provided by the financial services providers 141, the online resources 142, or any other type of third-party entity 143. This client program may be used to accept user/customer input or provide information (e.g., customer interface activity data or user identification data) to the computer system 110 and to receive information from the computer system 110. In some examples, the client program may be a mobile application that is run on user device 160 or customer device 150. User device 160 and/or customer device 150 may be a mobile device (e.g., smartphone, tablet, pager, personal digital assistant (PDA)), a computer (e.g., laptop computer, desktop computer, server), or a wearable device (e.g., smart watch). User device 160 and/or customer device 150 may also include any other media content player, for example, a set-top box, a television set, a video game system, or any electronic device capable of providing or rendering data. User device 160 and/or customer device 150 may optionally be portable. The User device 160 and/or customer device 150 may be handheld. User device 160 and/or customer device 150 may be a network device capable of connecting to a network, such as network 130, or other networks such as a local area network (LAN), wide area network (WAN) such as the Internet, a telecommunications network, a data network, or any other type of network.

Computer system 110 may be part of an entity 105, which may be any type of company, organization, or institution. In some examples, entity 105 may be a financial services provider 141. In such examples, the computer system 110 may have access to data pertaining to transactions through a private network within the entity 105. For example, if the entity 105 is a card issuer, entity 105 may collect and store data involving a credit card or debit card issued by the entity 105. In such examples, the computer system 110 may still receive data from other financial services providers 141.

Figure 2:
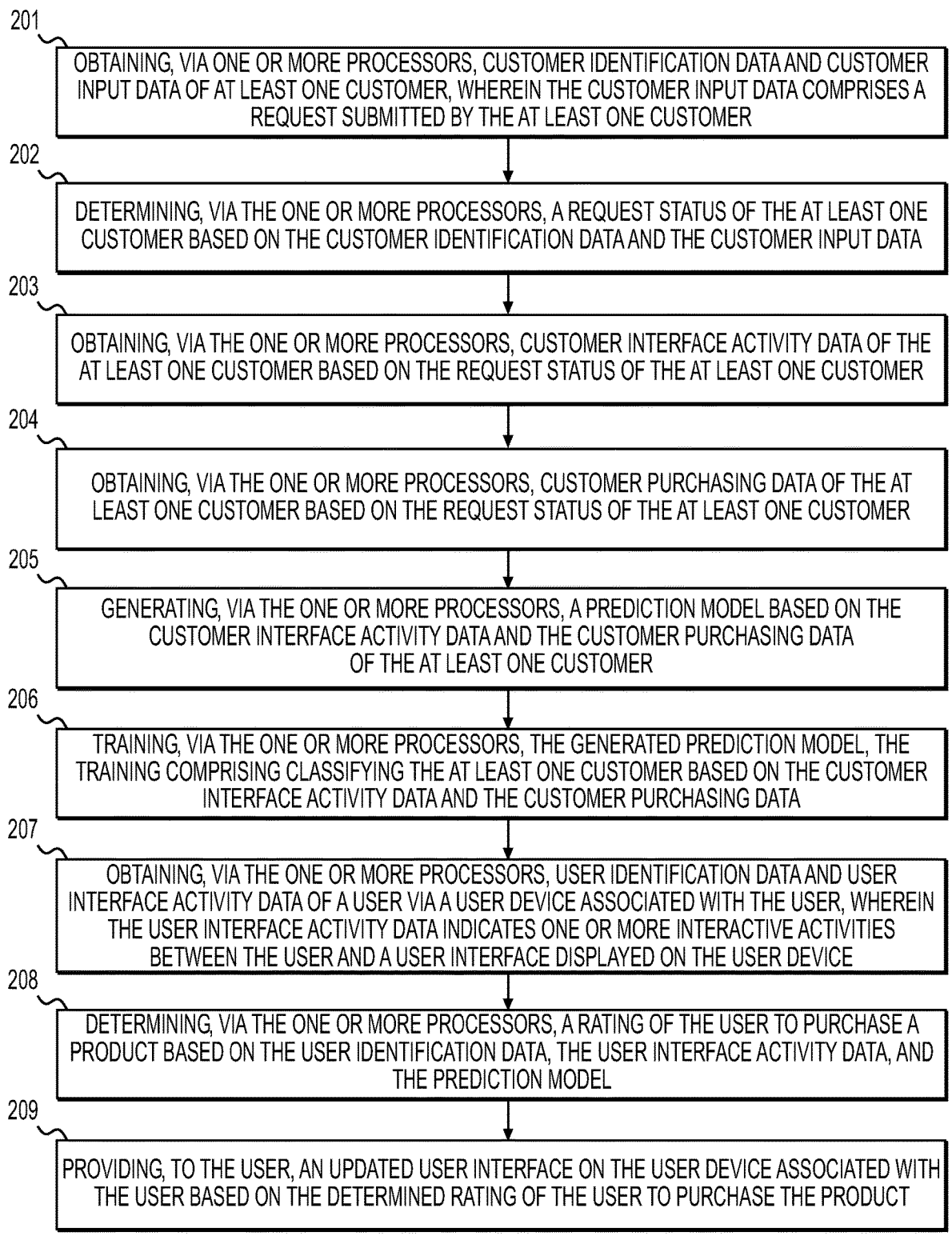
FIG. 2 depicts a flowchart of an exemplary method for providing an updated user interface to a user, according to one or more embodiments.

FIG. 2 is a flowchart illustrating a method for providing an updated user interface to the user, according to one or more embodiments of the present disclosure. The method may be performed by computer system 110.

Step 201 may include obtaining, via one or more processors, customer identification data and customer input data of at least one customer, e.g., a record associated with at least one historical customer. The customer identification data may include at least one of a name, a password, a numerical identifier associated with the at least one historical customer, or the like. For example, the customer identification data may include a social security number of the at least one historical customer. The identification data may further or alternatively include an actual name, contact information (e.g., address, phone numbers, e-mail addresses, etc.), a social security number, and/or additional information pertaining to the at least one historical customer. The additional information may include, e.g., customer preference information, demographic information (e.g., age, gender, marital status, income level, educational background, number of children in household, etc.), employment, and/or other data related to the at least one customer. The customer input data may further or alternatively include a request submitted by the at least one historical customer. The request may be a prequalification request associated with the at least one historical customer. The request may include any information indicative of and/or regarding purchasing a product, including a social security number or a credit score of the at least one historical customer, or the like.

Step 202 may include determining, via the one or more processors, a request status of the at least one historical customer based on the customer identification data and the customer input data. The request status of the at least one historical customer may indicate whether the at least one customer is prequalified to purchase one or more products within a specified price range based on the customer identification data and/or customer input data of the user. For example, the prequalification status may indicate that the historical customer is prequalified to purchase a vehicle from $20,000.00 to $30,000.00 based on a credit score of 700.

Step 203 may include obtaining, via the one or more processors, customer interface activity data of the at least one historical customer based on the request status of the at least one historical customer. The customer interface activity data may indicate one or more interactive activities between the at least one historical customer and a customer interface displayed on the customer device 150 associated with the at least one historical customer. The customer interface activity data may further indicate at least a level of interaction of one of the one or more interactive activities between the at least one historical customer and the customer interface displayed on the customer device 150 associated with the at least one historical customer. The one or more interactive activities may include at least one of an action of clicking a link, an action of typing a search term, or an action of selecting a filter performed by the user. The customer device 150 may be capable of accepting customer inputs via one or more interactive components of the customer device 150, such as a keyboard, button, mouse, touchscreen, touchpad, joystick, trackball, camera, microphone, or motion sensor input. For instance, the customer may type a product name via a keyboard provided on the display of the device associated with the customer. In another example, the historical customer may click on one or more selections associated with a product displayed on a display of the customer device. The one or more selections may be in a form of a link, button, or hyperlink.

Step 204 may include obtaining, via the one or more processors, customer purchasing data of the at least one historical customer based on the request status of the at least one customer. The customer purchasing data may include at least one of a confirmation of purchasing the product, a time of purchasing the product, or a location of purchasing the product. The customer purchasing data may include any information regarding a transaction associated with purchasing a product, for example, a customer identifier, contact information (e.g., address, phone numbers, e-mail addresses, etc.), demographic information (e.g., age, gender, marital status, income level, educational background, number of children in household, etc.), customer preferences (preferences or reviews regarding favorite products and/or services, favorite department stores, etc.), a transaction amount, and previous transaction information. The previous transaction information may include a time of a prior transaction, a location of a prior transaction, spending profile of a historical customer, past spending levels on goods sold by various manufacturers or merchants, a frequency of shopping by the historical customer at one or more merchants, how much the historical customer spends in an average transaction, how much the historical customer has spent on a particular product, how often the historical customer shops in a particular store or kind of merchant, an estimated profit margin on goods previously purchased, or online or offline stores at which the customer has purchased items. The customer purchasing data may include safety or recall information regarding the product, upgrade or repair information specific to the product, possible substitute or compatible items for the products, and so forth. The product may include a vehicle. In some embodiments, the product may be any item (e.g., a property) or service (e.g., credit card application) provided by a merchant or a financial services provider 141.

Step 205 may include generating, via the one or more processors, a prediction model based on the customer interface activity data and the customer purchasing data of the at least one historical customer. Any suitable type of model, and any suitable technique for generating the model may be used. Step 206 may include training, via the one or more processors, the generated prediction model. The training may include classifying the at least one historical customer based on the customer interface activity data and the customer purchasing data. For example, the at least one historical customer may be classified as a serious customer based on the request status of the at least one historical customer.

The prediction model may include a trained machine learning algorithm/model. The trained machine learning algorithm may include a regression-based model that accepts the customer identification data, customer input data, customer interface activity data, or customer purchasing data as input data. The trained machine learning algorithm may be part of the algorithm model 112. The trained machine learning algorithm may be of any suitable form, and may include, for example, a neural network. A neural network may be software representing a human neural system (e.g., cognitive system). A neural network may include a series of layers termed "neurons" or "nodes." A neural network may comprise an input layer, to which data is presented, one or more internal layers, and an output layer. The number of neurons in each layer may be related to the complexity of a problem to be solved. Input neurons may receive data being presented and then transmit the data to the first internal layer through the connections' weight. The trained machine learning algorithm may include a convolutional neural network (CNN), a deep neural network, a recurrent neural network (RNN), or any other type of neural network.

The machine learning algorithm may be trained by supervised, unsupervised, or semi-supervised learning using training sets comprising data of types similar to the type of data used as the model input. For example, the training set used to train the model may include any combination of the following: the customer identification data, customer input data, customer interface activity data, or customer purchasing data, or any other data. Accordingly, the machine learning model may be trained to map input variables (e.g., identification data and/or interface activity data) to a quantity or value of a rating of the user's interest, seriousness, commitment or the like to purchase a product. That is, the machine learning model may be trained to determine a quantity or value of a rating associated with the user's seriousness to purchase a product as a function of various input variables.

The machine learning algorithm may include a classification algorithm. The classification algorithm may include linear classifiers (e.g., logistic regression, Naïve Bayes classifier), support vector machines, quadratic classifiers, Kernel estimation (e.g., k-nearest neighbor), boosting (e.g., gradient boosting machines), or decision trees (e.g., random forests). The k-nearest neighbors algorithm (k-NN) may include a training phase including storing the feature vectors and class labels of the training samples. The k-nearest neighbors algorithm (k-NN) may include a classification phase including k as a user-defined constant and an unlabeled vector (a query or test point) classified by assigning the label which is most frequent among the k training samples nearest to that query point. A commonly used distance metric for continuous variables is Euclidean distance.

In some instances the historical customer may return to an electronic store, and thus may be considered a user. In some instances, a person other than a historical customer may visit the electronic store, and thus may be considered a user. Step 207 may include obtaining, via the one or more processors, user identification data and user interface activity data of a user via the user device 160 associated with the user. The user identification data may include at least one of a name, a password, or a social security number of the user. The identification data may further or alternatively include an actual name, contact information (e.g., address, phone numbers, e-mail addresses, etc.), a social security number, and/or additional information pertaining to the at least one user. The additional information may include, e.g., user preference information, demographic information (e.g., age, gender, marital status, income level, educational background, number of children in household, etc.), employment, and/or other data related to the at least one customer. In some embodiments, the user may withhold at least a portion of the user identification data, and the user may be at least partially anonymous.

The user interface activity data indicates one or more interactive activities between the user and a user interface displayed on the user device 160. The user may or may not be the at least one customer. The user interface activity data may indicate one or more interactive activities between the user and a user interface displayed on a user device 160 associated with the user. The user interface activity data may further indicate at least a level of interaction of one of the one or more interactive activities between the user and the user interface displayed on the user device 160 associated with the user. The one or more interactive activities include at least one of an action of clicking a link, an action of typing a search term, or an action of selecting a filter performed by the user. The user device 160 may be capable of accepting user inputs via one or more interactive components of the user device 160, such as a keyboard, button, mouse, touchscreen, touchpad, joystick, trackball, camera, microphone, or motion sensor input. For instance, the user may type a product name via a keyboard provided on the display of the device associated with the user. In another example, the user may click on one or more selections associated with a product displayed on a display of the user device 160. The one or more selections may be in a form of a link, button, or hyperlink.

Step 208 may include determining, via the one or more processors, a rating of the user's interest and/or seriousness in purchasing a product based on the user identification data, the user interface activity data, and/or the prediction model. The product may be a vehicle. Step 209 may include providing, to the user, an updated user interface on the user device 160 associated with the user based on the determined rating of the user's seriousness to purchase the product. The updated user interface may be configured to be displayed on the device associated with the user (user device 160). The updated user interface may include one or more elements and/or an arrangement of the one or more elements selected based on the determined rating of the user's seriousness. In other words, the updated user interface may be different for different users with different seriousness ratings, or may be different for a user at different times based on a determination that the user's seriousness has changed.

The user interface may include an interactive feature configured to enable the user to accept or reject a vehicle recommendation. The user interface may include information regarding the vehicle recommendation. The user interface may include information and/or selectable options relating to financial information or qualifications. The user interface may include an arrangement that more prominently features some elements and less prominently features others. In some embodiments, the user interface may be configured to be displayed on a display screen of a user device associated with the user (e.g., user device 160). The user device 160 may be capable of accepting inputs of a user via one or more interactive components of the user device 160, such as a keyboard, button, mouse, touchscreen, touchpad, joystick, trackball, camera, microphone, or motion sensor.

Figure 3:
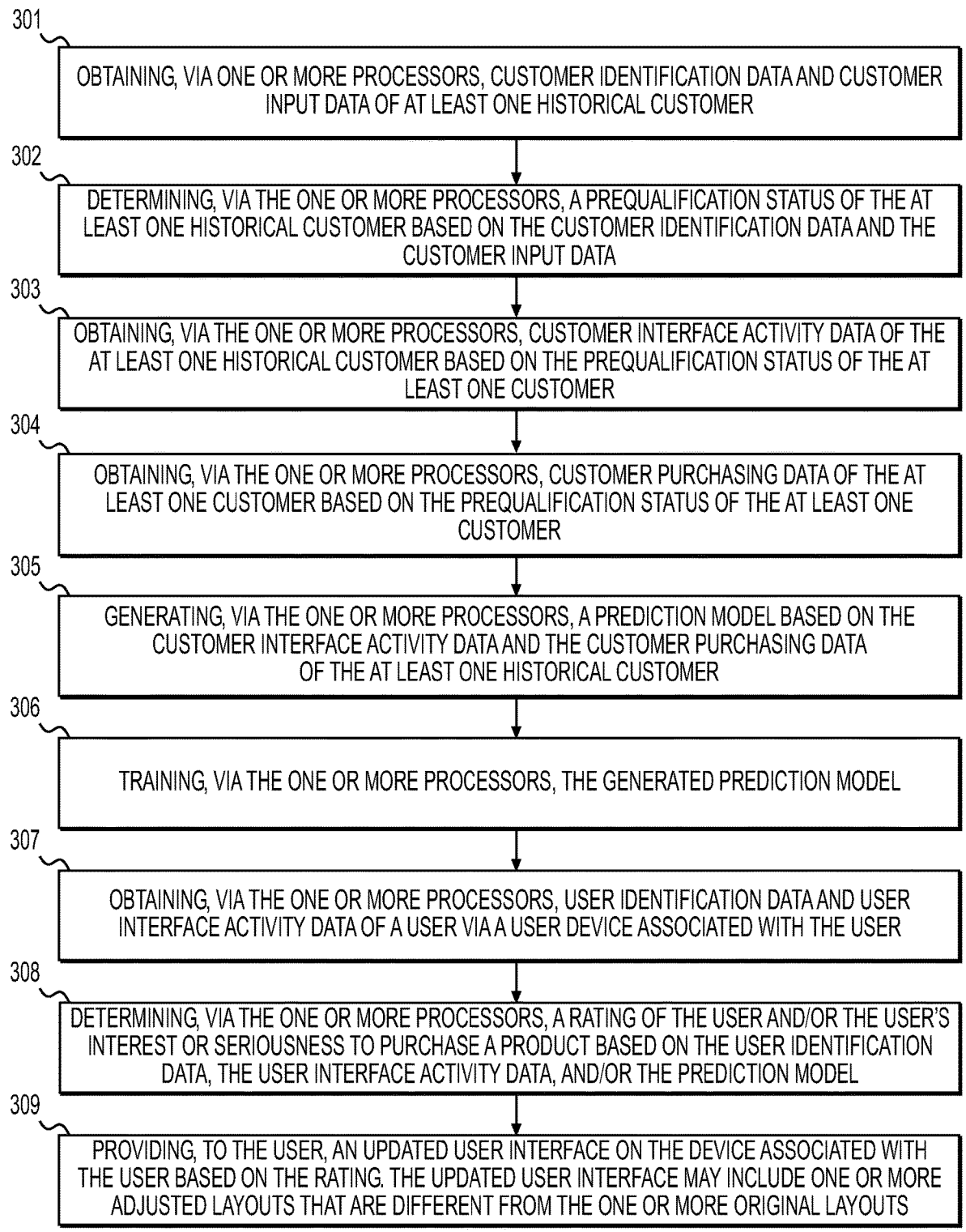
FIG. 3 depicts a flowchart of an exemplary method for providing a personalized electronic store experience to a visitor, according to one or more embodiments.

FIG. 3 is a flowchart illustrating another exemplary method for providing an updated user interface to a user, according to one or more embodiments of the present disclosure. The method may be performed by computer system 110.

Step 301 may include obtaining, via one or more processors, customer identification data and customer input data of at least one historical customer. The customer input data may include a prequalification request submitted by the at least one historical customer. The customer identification data may include at least one of a name, a password, or a social security number of the at least one historical customer. Details of the customer input data and the customer identification data are described elsewhere herein.

Step 302 may include determining, via the one or more processors, a prequalification status of the at least one historical customer based on the customer identification data and the customer input data. The prequalification status of the at least one historical customer may identify the at least one historical customer as a prequalified customer. For example, the prequalification status may indicate whether the historical customer is prequalified to purchase one or more products within a specified price range based on the credit score of the user. For example, the prequalification status may indicate that the historical customer is prequalified to purchase a vehicle from $20,000.00 to $30,000.00 based on a credit score of 700. The prequalification status may also show whether the historical customer is prequalified to apply for financial cards (e.g., credit card) based on the credit score of the historical customer.

Step 303 may include obtaining, via the one or more processors, customer interface activity data of the at least one historical customer based on the prequalification status of the at least one customer. For example, the prequalification status may indicate that the historical customer is prequalified to purchase a vehicle from $20,000.00 to $30,000.00 based on a credit score of 700. If the historical customer is prequalified to purchase the vehicle, the customer interface activity data may be obtained. Details of the customer interface activity data are described elsewhere herein.

Step 304 may include obtaining, via the one or more processors, customer purchasing data of the at least one customer based on the prequalification status of the at least one customer. For example, the prequalification status may indicate that the historical customer is prequalified to purchase a vehicle from $20,000.00 to $30,000.00 based on a credit score of 700. If the historical customer is prequalified to purchase the vehicle, the customer purchasing data may be obtained. Customer purchasing data may include, for example, whether the at least one customer completed a purchase and of what. Details of the customer purchasing data are described elsewhere herein.

Step 305 may include generating, via the one or more processors, a prediction model based on the customer interface activity data and the customer purchasing data of the at least one historical customer. Step 306 may include training, via the one or more processors, the generated prediction model. The training may include classifying the at least one historical customer based on the customer interface activity data and the customer purchasing data as described elsewhere herein.

Step 307 may include obtaining, via the one or more processors, user identification data and user interface activity data of a user via a user device associated with the user. The user interface activity data may indicate one or more interactive activities between the user and a user interface including one or more original layouts displayed on the user device. For example, in some embodiments, the user may access an electronic store and encounter a first, original layout, and the user's interactions with this first original layout may be tracked.

Step 308 may include determining, via the one or more processors, a rating of the user and/or the user's interest or seriousness to purchase a product based on the user identification data, the user interface activity data, and/or the prediction model.

Step 309 may include providing, to the user, an updated user interface on the device associated the user based on the rating. The updated user interface may include one or more adjusted layouts that are different from the one or more original layouts. In other words, the rating may indicate that the first original layout is not matched to the user's interest or seriousness to purchase the product, and thus the first original layout may be adjusted or updated to more closely align with the user's rating. This may include adding, removing, or rearranging elements of the layout, as discussed in more detail elsewhere.

At any stage of updating a user interface, the method may further include storing any information, including, for example, the customer purchasing data, the customer interface activity data, the user interface activity data, etc., for subsequent analysis. The stored data may have an expiration period. The expiration period may be at least 1 day, 1 week, 1 month, 1 quarter, 1 year, or longer. In other embodiments, the expiration period may be at most 1 year, 1 quarter, 1 month, 1 week, 1 day, or shorter. The subsequent analysis may include analyzing the information. The stored data may also be one of the one or more variables used in training a trained machine learning model. Details of the trained machine learning model are described elsewhere herein.

Additional aspects of this disclosure are illustrated in further embodiments below.

In an exemplary embodiment, a method for personalizing a visitor experience of an electronic store includes: receiving an indication that a visitor has accessed an electronic store; tracking interactions of the visitor with the electronic store; based on the tracked interactions of the visitor, determining whether the visitor is a serious customer or a non-serious customer; and altering the electronic store based on the determination. In some embodiments, the determining is performed in response to one or more of tracking of the visitor's interactions over a predetermined period of time, tracking at least a predetermined quantity of interactions, or identifying a predetermined interaction and/or pattern of interactions. In some embodiments, an interaction may include, for example, a mouse movement, a mouse hover, a click, a selection, a view of a website page or portion of the electronic store, a search, combinations thereof and/or patterns formed thereby. In some embodiments, altering the electronic store may include, for example, adding, removing, rearranging, re-coloring, highlighting, or de-emphasizing content on the electronic store. Content may include, for example, advertisement content, product information, information related to financial services, directions to the visitor, or combinations thereof. In some embodiments, the determining includes employing a machine learning model that is trained, via historical customer interactions, to determine whether, based on the tracked interactions of the visitor, whether the visitor is a serious customer or not.

In an exemplary embodiment, training a machine learning model to determine whether a visitor is a serious customer or not may include identifying at least one historical customer that is classified as a serious customer, retrieving tracked interactions of the at least one identified historical customer, and training the machine learning model using the retrieved tracked interactions as training data and the classification as ground truth for the classification of the at least one historical customer. In some embodiments, the machine learning model employs a neural network. In some embodiments, the at least one historical customer is identified based on one or more of whether the at least one historical customer obtained a loan or other type of financial prequalification, or whether the at least one historical customer completed a purchase. In some embodiments, the retrieved tracked interactions are from respective periods of time prior to when the at least one historical customer obtained the prequalification and/or completed the purchase.

In some embodiments, the training of the machine learning model is carried out more than once. For example, in some embodiments, a merchant may, from time to time, make alterations to an electronic store, such as to add, remove, or rearrange content, information, advertising, or the like. The machine learning model may be retrained in order to account for changes to the electronic store. For example, the machine learning model may be retrained periodically, on request of a user, in response to an indication that the electronic store has been modified, or in response to any other suitable criterion.

In general, any process discussed in this disclosure that is understood to be computer-implementable, such as the processes illustrated in FIGS. 2 and 3, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable type of processing unit.

A computer system, such as computer system 110 and/or user device 150, may include one or more computing devices. If the one or more processors of the computer system 110 and/or user device 150 are implemented as a plurality of processors, the plurality of processors may be included in a single computing device or distributed among a plurality of computing devices. If computer system 110 and/or user device 150 comprises a plurality of computing devices, the memory of the computer system 110 may include the respective memory of each computing device of the plurality of computing devices.

Figure 4:
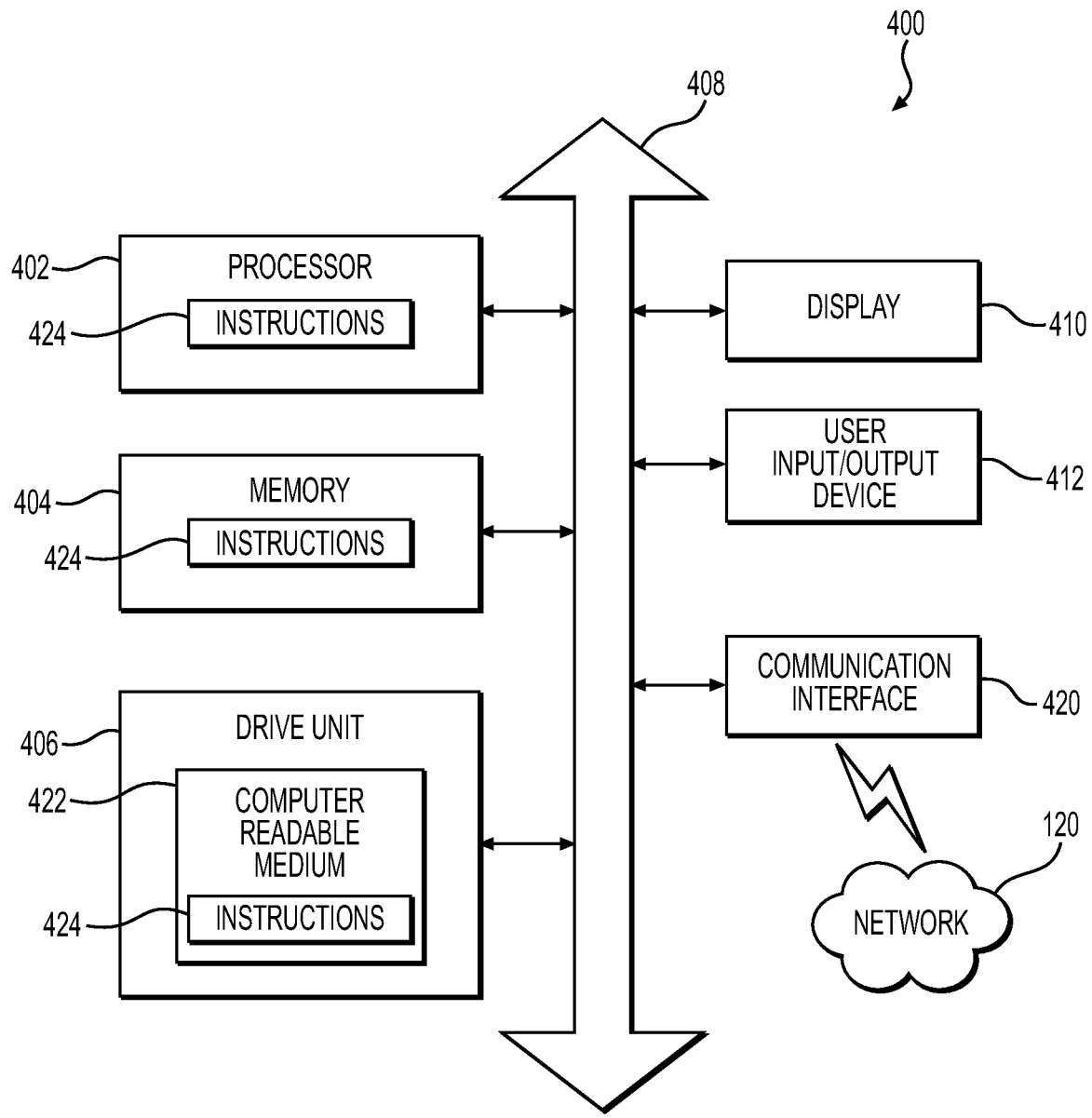
FIG. 4 depicts an example of a computing device, according to one or more embodiments.

FIG. 4 is a simplified functional block diagram of a computer 400 that may be configured as a device for executing the methods of FIGS. 2 and 3, according to exemplary embodiments of the present disclosure. FIG. 4 is a simplified functional block diagram of a computer that may be configured as the system 110 and/or the user device 150 according to exemplary embodiments of the present disclosure. Specifically, in one embodiment, any of the mobile devices, systems, servers, etc., discussed herein may be an assembly of hardware 400 including, for example, a data communication interface 420 for packet data communication. The platform also may include a central processing unit ("CPU") 402, in the form of one or more processors, for executing program instructions. The platform may include an internal communication bus 408, and a storage unit 406 (such as ROM, HDD, SDD, etc.) that may store data on a computer readable medium 422, although the system 400 may receive programming and data via network communications. The system 400 may also have a memory 404 (such as RAM) storing instructions 424 for executing techniques presented herein, although the instructions 424 may be stored temporarily or permanently within other modules of system 400 (e.g., processor 402 and/or computer readable medium 422). The system 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for personalizing a visitor experience of an electronic store includes:
   receiving, via at least one processor of a system associated with an electronic store, an indication that a visitor has accessed the electronic store via a user device;
   generating, via the at least one processor, tracking data indicative of interactions of the visitor with the electronic store via the user device;
   inputting the tracking data into a model, and determining, via the at least one processor and by using the tracking data with the model, whether the visitor is in a browsing stage or in a purchasing stage, wherein the model has been trained only using training tracking data from one or more individuals other than the visitor that is for interactions that occurred prior to a point in time at which the one or more individuals obtained a prequalification; and
   altering, via the at least one processor, the electronic store based on the determination by one or more of adding, removing, rearranging, re-coloring, highlighting, or de-emphasizing one or more interactive features displayed on a user interface of the electronic store, the one or more interactive features including a selectable element that is operable to one or more of: accept or reject a product recommendation; or cause the user device to navigate to a resource for obtaining a pre-qualification, financial information, or an electronic offer on the electronic store for purchase of a product.

2. The computer-implemented method of claim 1, wherein the determining is performed in response to one or more of tracking of the visitor's interactions over a predetermined period of time, tracking at least a predetermined quantity of interactions, or identifying a predetermined interaction or pattern of interactions.

3. The computer-implemented method of claim 1, wherein the interactions of the visitor include a mouse movement, a mouse hover, a click, a selection, a view of a website page or portion of the electronic store, a search, combinations thereof or patterns formed thereby.

4. The computer-implemented method of claim 1, wherein the one or more interactive features on the user interface of the electronic store further includes one or more of advertisement content, product information, information related to financial services, or directions to the visitor.

5. The computer-implemented method of claim 1, wherein the model is a machine learning model that has been trained, based on historical customer interactions of browsing customers and of purchasing customers, to learn associations between the historical customer interactions and whether a historical customer was browsing or purchasing, such that the trained machine learning model is configured determine, based on the tracking data, whether the visitor is in the browsing stage or in the purchasing stage.

6. A computer-implemented method of producing a machine learning model for determining whether a visitor is in a browsing stage or in a purchasing stage, comprising:
  performing an iteration of training the machine learning model, by:
    identifying, via at least one processor, at least one historical customer of an electronic store that completed a purchase at the electronic store;
    retrieving, via the at least one processor and from a system associated with the electronic store, tracking data indicative of interactions between the at least one identified historical customer and the electronic store via at least one customer device;
    identifying a point in time at which the at least one customer obtained a prequalification;
    isolating a portion of the tracking data corresponding to interactions that occurred prior to the point in time at which the at least one customer obtained the prequalification, and extracting the portion of the tracking data; and
    training, via the at least one processor, the machine learning model using only the extracted portion of the tracking data corresponding to the interactions that occurred prior to the point in time at which the at least one customer obtaining the prequalification as training data, to associate the interactions in the extracted data with the completion of purchases, such that the machine learning model is trained to determine whether input tracking data includes interactions indicative of a customer in a purchasing stage;
  receiving an indication that the electronic store has been altered;
  in response to receiving the indication, performing a further iteration of the training of the machine learning model for at least one historical customer that completed a purchase at the altered electronic store.

7. The computer-implemented method of claim 6, wherein the machine learning model employs a neural network.

8. The computer-implemented method of claim 6, wherein the alteration of the electronic store includes one or more of an addition to, a removal from, a re-coloring of, a highlighting of, a de-emphasizing of, or a rearrangement of at least a portion of content of the electronic store.

9. The computer-implemented method of claim 8, wherein the content on the electronic store includes one or more of advertisement content, product information, information related to financial services, or directions to the visitor.

10. The computer-implemented method of claim 6, wherein the further iteration is performed in response to receiving the indication and to receiving a user request.

11. The computer-implemented method of claim 6, wherein the tracked interactions include a mouse movement, a mouse hover, a click, a selection, a view of a website page or portion of the electronic store, a search, combinations thereof or patterns formed thereby.

12. The computer-implemented method of claim 5, wherein the interactions of the visitor include a mouse movement, a mouse hover, a click, a selection, a view of a website page or portion of the electronic store, a search, combinations thereof or patterns formed thereby.

13. A system for personalizing a visitor experience of an electronic store, comprising:
  at least one processor; and
  at least one memory operatively connected to the processor and storing instructions executable by the processor to perform operations, including:
    receiving an indication that a visitor has accessed the electronic store via a user device;
    generating tracking data indicative of interactions of the visitor with the electronic store via the user device, wherein the interactions of the visitor include a mouse movement, a mouse hover, a click, a selection, a view of a website page or portion of the electronic store, a search, combinations thereof or patterns formed thereby;
    inputting the tracking data into a customer interaction model, and determining, by using the tracking data with the customer interaction model, whether the visitor is in a browsing stage or in a purchasing stage, wherein the customer interaction model has been trained only using training tracking data from one or more individuals other than the visitor that is for interactions that occurred prior to a point in time at which the one or more individuals obtained a pre-qualification; and
    altering the electronic store based on the determination by one or more of adding, removing, rearranging, re-coloring, highlighting, or de-emphasizing one or more interactive features displayed on a user interface of the electronic store, the one or more interactive features including a selectable element that is operable to one or more of: accept or reject a product recommendation; or cause the user device to navigate to a resource for obtaining a pre-qualification, financial information, or an electronic offer on the electronic store for purchase of a product.

14. The system of claim 13, wherein the determining is performed in response to one or more of tracking of the visitor's interactions over a predetermined period of time, tracking at least a predetermined quantity of interactions, or identifying a predetermined interaction or pattern of interactions.

15. The system of claim 13, wherein the interactions of the visitor include a mouse movement, a mouse hover, a click, a selection, a view of a website page or portion of the electronic store, a search, combinations thereof or patterns formed thereby.

16. The system of claim 13, wherein the one or more interactive features on the user interface of the electronic store further includes one or more of advertisement content, product information, information related to financial services, or directions to the visitor.

17. The system of claim 13, wherein the model is a machine learning model that has been trained, based on historical customer interactions of browsing customers and of purchasing customers, to learn associations between the historical customer interactions and whether a historical customer was browsing or purchasing, such that the trained machine learning model is configured determine, based on the tracking data, whether the visitor is in the browsing stage or in the purchasing stage.

18. The computer-implemented method of claim 1, wherein the computer-implemented method is performed prior to or without a login or identification of the visitor with the electronic store.

19. The system of claim 13, wherein the receiving, generating, inputting, and altering operations are performed prior to or without a login or identification of the visitor with the electronic store.

20. The computer-implemented method of claim 1, wherein the visitor has accessed the electronic store via a client program operating on the user device, the client program including a graphical interface configured to output the user interface of the electronic store.

* * * * *